United States Patent
Uozumi et al.

(10) Patent No.: US 8,344,895 B2
(45) Date of Patent: Jan. 1, 2013

(54) PHOTOELECTRIC SENSOR AND PHOTOELECTRIC SENSOR SYSTEM

(75) Inventors: Toyoichi Uozumi, Osaka (JP); Hiroki Murakami, Osaka (JP)

(73) Assignee: Keyence Corporation, Osaka (JP)

( * ) Notice: Subject to any disclaimer, the term of this patent is extended or adjusted under 35 U.S.C. 154(b) by 442 days.

(21) Appl. No.: 12/818,294

(22) Filed: Jun. 18, 2010

(65) Prior Publication Data

US 2011/0018722 A1 Jan. 27, 2011

(30) Foreign Application Priority Data

Jul. 24, 2009 (JP) ................................. 2009-173757

(51) Int. Cl.
*G08B 17/12* (2006.01)
(52) U.S. Cl. ....................................................... 340/600
(58) Field of Classification Search .................. 340/600, 340/555, 556, 557, 630; 250/200, 221, 565
See application file for complete search history.

(56) References Cited

U.S. PATENT DOCUMENTS

| | | | | |
|---|---|---|---|---|
| 5,026,978 | A | * | 6/1991 | Misumi et al. ............... 250/205 |
| 6,211,784 | B1 | * | 4/2001 | Nishide ...................... 340/568.1 |
| 6,323,481 | B2 | * | 11/2001 | Ueki ............................. 250/221 |
| 6,838,656 | B2 | * | 1/2005 | Okamoto ...................... 250/221 |
| 6,891,142 | B2 | * | 5/2005 | Ogawa .......................... 250/205 |

FOREIGN PATENT DOCUMENTS

| | | |
|---|---|---|
| JP | 09-252242 | 9/1997 |
| JP | 2002-279871 | 9/2002 |
| JP | 2002-318139 | 10/2002 |
| JP | 2002-324465 | 11/2002 |
| JP | 2003-108025 | 4/2003 |
| JP | 2004-184193 | 7/2004 |
| JP | 2005-109528 | 4/2005 |
| JP | 2005-181343 | 7/2005 |
| JP | 2005-210720 | 8/2005 |
| JP | 2006-003136 | 1/2006 |
| JP | 2006-351380 | 12/2006 |
| JP | 2007-142627 | 6/2007 |
| JP | 2007-158497 | 6/2007 |
| JP | 2007-158641 | 6/2007 |

* cited by examiner

*Primary Examiner* — Phung Nguyen
(74) *Attorney, Agent, or Firm* — Kilyk & Bowersox, P.L.L.C.

(57) ABSTRACT

There are provided a photoelectric sensor and a photoelectric sensor system in which received light quantities of a plurality of photoelectric sensors are displayed in an integrated manner, and slight variation in the received light quantity that has nothing to do with a detected condition of a workpiece is ignored and a photoelectric sensor with abnormity is easily found out. Upon acceptance of an instruction to execute scaled display by a control unit of a photoelectric sensor, a scaling adjustment ratio is calculated by assigning the received light quantity to a target value set to be greater than a display upper limit while executing the scaled display. A received light quantity that is subsequently obtained is scaled based on the calculated scaling adjustment ratio to obtain a received light quantity after the scaling.

8 Claims, 7 Drawing Sheets

F I G. 7
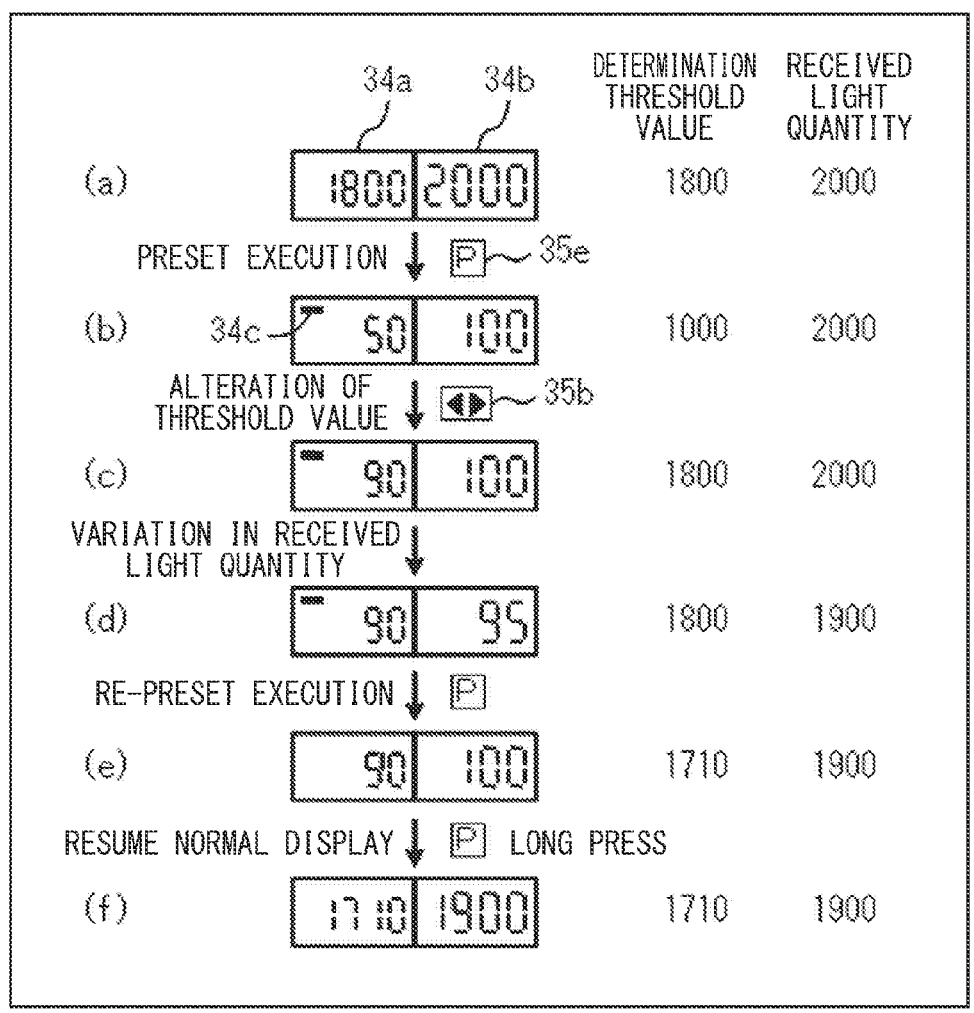

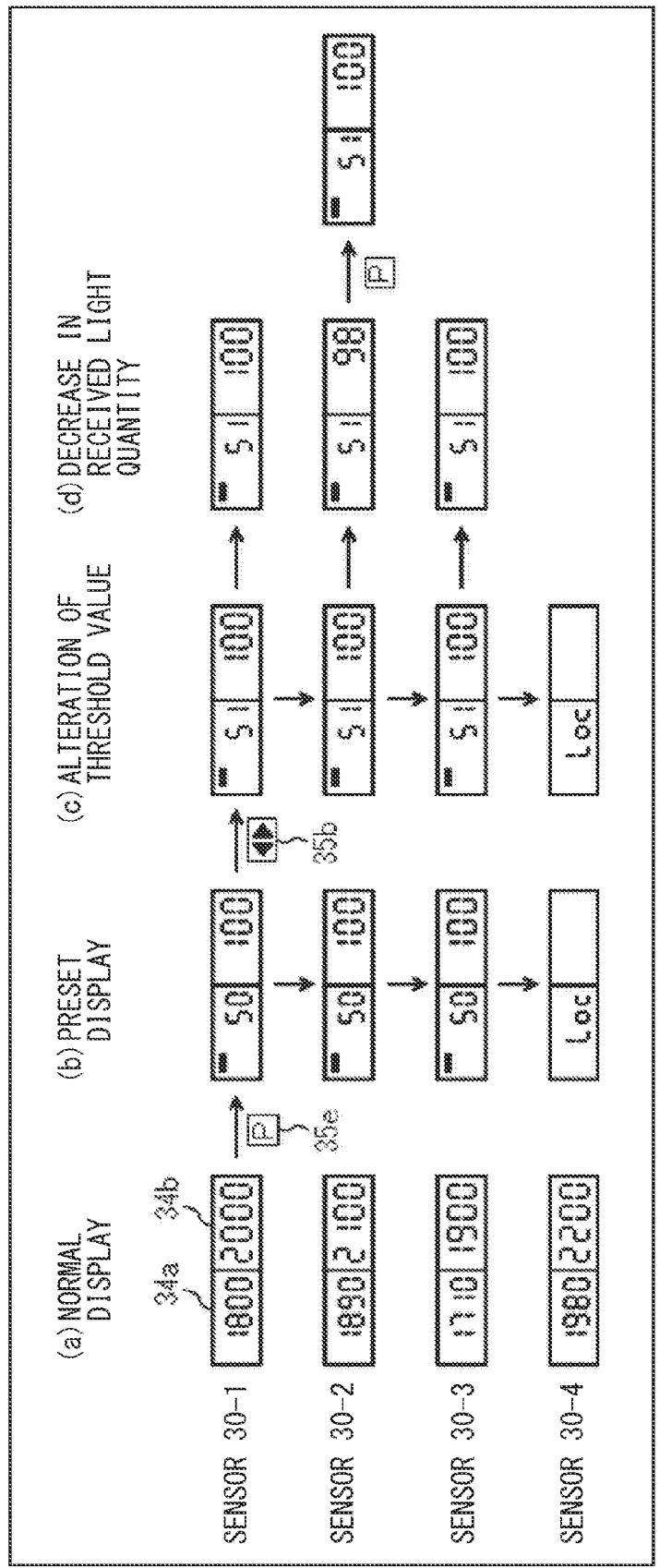
F I G. 8

PHOTOELECTRIC SENSOR AND PHOTOELECTRIC SENSOR SYSTEM

CROSS-REFERENCE TO RELATED APPLICATIONS

The present application claims foreign priority based on Japanese Patent Application No. 2009-173757, filed Jul. 24, 2009, the contents of which is incorporated herein by reference.

BACKGROUND OF THE INVENTION

1. Field of the Invention

The present invention relates to a photoelectric sensor capable of detecting a desired workpiece by comparing a received light quantity with a threshold value, and a photoelectric sensor system configured by coupling a plurality of such photoelectric sensors.

2. Description of Related Art

A photoelectric sensor typically projects light to a detection area and receives light from the detection area, and compares a quantity of the received light with a predetermined threshold value, thereby detecting the presence of a workpiece in the detection area. As one aspect of this type of photoelectric sensors, there has been known a photoelectric sensor system in which a plurality of such photoelectric sensors are coupled and light is projected to plurality of portions, thereby monitoring a condition of a workpiece.

Such a photoelectric sensor includes a light-emitting device such as an LED or a laser diode and a light-receiving device such as a photodiode that are built-in. The commonly used photoelectric sensors inevitably show variation in luminance of the light-emitting devices and variation in sensitivity and offset of the light-receiving devices, and such. Further, in the case of the photoelectric sensors of a type in which an optical fiber is inserted and light is guided using the optical fiber, variation in light coupling efficiency is also shown due to variation in insertion of the optical fibers. As a result of these variations among the individual sensors, even when the plurality of photoelectric sensors are used under the same environment, quantities of the received light obtained by the respective photoelectric sensors do not become completely the same.

If the received light quantity obtained for each photoelectric sensor is different from sensor to sensor, it is necessary to set a threshold value that corresponds to a characteristic of each photoelectric sensor, resulting in a lot of trouble for a user. In addition, if the displayed received light quantity is different from sensor to sensor even though the photoelectric sensors are used under the same environment, this can possibly undermine the user's confidence in the system.

At the same time, there has conventionally been known a scaling function for scaling the received light quantities to display. The scaling function is for adjusting a received light quantity to a previously set scaling target value and displaying a received light quantity that is obtained subsequently by scaling up or down based on a scaling adjustment ratio (see Japanese Unexamined Patent Application Publication No. 2007-158497, for example). Known examples of the scaling function include a technique that the light-emitting device and the light-receiving device are controlled such that an actually obtained received light quantity becomes closer to a scaling target value, or that an actually obtained received light quantity is not changed and a displayed value of the received light quantity is displayed by scaling up or down.

By executing the scaling function, it is easily possible to set the received light quantities of the plurality of photoelectric sensors to be displayed as an identical value. Accordingly, it is possible to manage the threshold value of the plurality of photoelectric sensors in an integrated manner, as well as to improve the way in which the display of the received light quantities look for the user.

SUMMARY OF THE INVENTION

However, the conventional scaling function as described above only adjusts the received light quantity of each photoelectric sensor to conform to a scaling target value by hardware or software, and variations can be generated immediately after executing the scaling function to the display of the received light quantities due to a slight environmental change or dirt that has nothing to do with a detected condition of the workpiece. Therefore, the user is required to frequently execute the scaling function, thereby taking a lot of trouble. Further, as the original received light quantity is lost by executing the scaling function, it is difficult for the user to recognize the magnitude that the received light quantities are lowered if the scaling target value of the photoelectric sensor is different from sensor to sensor. Accordingly, it is not possible for the user to easily determine whether the lowering of the received light quantity is at an acceptable level, or an immediate maintenance is required.

The present invention is made in view of the above problem. An object of the present invention is to provide a photoelectric sensor and a photoelectric sensor system with which received light quantities of a plurality of photoelectric sensors are displayed in an integrated manner, the display of the received light quantities is stabilized without any influence of variations in the light quantities that has nothing to do with a detected condition of a workpiece, and a photoelectric sensor with abnormity can be easily found out.

In order to solve the above problem, the present invention provides a photoelectric sensor that is provided with a light projecting unit projecting light toward a detection area and a light receiving unit receiving light from the detection area and generating a received light signal, the sensor being capable of obtaining a received light quantity based on the received light signal generated by the light receiving unit and comparing the received light quantity with a previously set threshold value, thereby detecting the presence of a workpiece in the detection area, the sensor including: a display unit that displays the received light quantity; an operation unit for instructing to execute a scaling function of assigning the received light quantity displayed in the display unit to a previously set target value; and a control unit that assigns a received light quantity when the instruction to execute the scaling function is accepted to the previously set target value, calculates a scaling adjustment ratio that is either a scale-up ratio or a scale-down ratio for assigning the received light quantity to the target value, and causes the display unit to display a received light quantity after the scaling obtained by scaling a subsequently obtained received light quantity up or down based on the scaling adjustment ratio, wherein the control unit assigns the received light quantity to a target value that is set to be greater than a display upper limit while executing the scaling function, and causes the display unit to display the display upper limit as the received light quantity after the scaling if the received light quantity after the scaling becomes greater than the display upper limit.

According to the present invention, upon acceptance of the instruction to execute the scaling function by the control unit, the received light quantity is assigned to the target value that has been set to be greater than the display upper limit while executing the scaling function. Consequently, when the scaling function is executed, the display upper limit is first displayed as the received light quantity after the scaling in the display unit. The received light quantity that is subsequently obtained is scaled up or down based on the scaling adjustment ratio and displays the received light quantity after the scaling. The received light quantity after the scaling at this time is calculated based on the scaling adjustment ratio obtained by assigning the received light quantity to the target value that is greater than the display upper limit while executing the scaling function. Therefore, by executing the scaling function to the plurality of photoelectric sensors, it is possible to display the display upper limit for all of the photoelectric sensors. Further, as the actual received light quantity is assigned to the target value greater than this display upper limit, the received light quantity after the scaling remains to be the display upper limit even if there is a slight decrease in the received light quantity. Therefore, the display can be stabilized without any influence of the slight decrease in the received light quantity due to an environmental change that has nothing to do with the condition of the workpiece.

Further, if there is a large decrease in the received light quantity regardless of the condition of the workpiece, the received light quantity after the scaling is displayed to be smaller than the display upper limit. In this case, it is probable that some kind of abnormity has occurred to the photoelectric sensor. Therefore, it is possible for the user to easily find out a photoelectric sensor with abnormity.

In this case, upon acceptance of the instruction to execute the scaling function, the control unit may set a threshold value of a previously set ratio with respect to the display upper limit.

With this, the threshold value is set to be the previously set ratio with respect to the display upper limit when executing the scaling function instead of the target value, it is possible to automatically set the same threshold value to all of the photoelectric sensors without depending on the magnitude of the target value, and to integrally manage the threshold value of the plurality of photoelectric sensors.

In this case, the display unit may include a first display unit that displays the threshold value and a second display unit that displays the received light quantity, and the control unit is capable of executing an adjustment process of the threshold value by accepting an operation of the threshold value adjusting button while the received light quantity after the scaling is displayed in the second display unit and altering the ratio of the threshold value with respect to the display upper limit, and, upon acceptance of an instruction to execute the scaling function again after adjusting the threshold value, the control unit may cause the display unit to display new received light quantity after the scaling by assigning a received light quantity at the acceptance to the target value, and maintain the ratio of the threshold value after the alteration.

With this, when the re-scaling display is executed after the ratio of the threshold value with respect to display upper limit is altered while executing the scaling function and the adjustment process of the threshold value is executed, the ratio after the alteration is maintained and the threshold value is set again. Accordingly, it is not necessary for the user to adjust the threshold value again after the re-scaling.

In this case, upon cancellation of the scaling function, the control unit may set the threshold value with respect to the received light quantity after canceling the scaling function again so as to maintain the ratio between the received light quantity and the threshold value after the scaling while executing the scaling function.

With this, as the ratio between the received light quantity after the scaling and the threshold value while executing the scaling function is maintained even after the user cancels the scaling function, it is not necessary to re-set the threshold value after canceling the scaling function.

In this case, the control unit is capable of selecting between making the target value to be equal to the display upper limit and increasing the target value to be greater than the display upper limit by accepting an operation from the operation unit, and the target value may be alterable within a predetermined range if the target value is increased to be greater than the display upper limit.

With this, it is possible to reflect even a slight decrease of the received light quantity to the display if the user sets the target value, for example, to be equal to the display upper limit. In contrast, if the target value is set to be greater than the display upper limit, the user can set an amount of decrease of the received light quantity that is not reflected to the display as the target value can be set within the predetermined range.

Here, the display unit can display an indication, while executing the scaling display, that the scaled display is being displayed.

With this, it is possible for the user to easily determine whether the current display is the display of the received light quantity or the received light quantity after the scaling.

In this case, the photoelectric sensor may be provided with a connection unit for communicating with a different photoelectric sensor, and the plurality of photoelectric sensors may be coupled via the connection unit, and the control unit may accept an instruction to execute a scaling function from the operation unit, and send the instruction to execute the scaling function to the different photoelectric sensor connected to the connection unit, a control unit of the different photoelectric sensor may accept the instruction to execute the scaling function and execute the scaling function.

With this, in the photoelectric sensor system in which the plurality of photoelectric sensors are coupled, when the one photoelectric sensor is given the instruction to execute the scaled display, the different photoelectric sensor is also given the instruction to execute the scaled display. Accordingly, it is possible to integrate the display of the plurality of photoelectric sensors without any effort.

In this case, upon acceptance of an adjustment process of the threshold value from the operation unit while executing the scaling function, the control unit may execute the adjustment process of the threshold value, and send a signal indicating the adjustment process of the threshold value to the different photoelectric sensor that is connected via the connection unit, and the control unit of the different photoelectric sensor may accept the signal indicating the adjustment process of the threshold value and execute the adjustment process of the threshold value.

With this, in the photoelectric sensor system in which the plurality of photoelectric sensors are coupled, when the adjustment process of the threshold value of the one photoelectric sensor is instructed while executing the scaling function, the adjustment process of the threshold value of the different photoelectric sensor is also instructed. Therefore, after executing the scaled display, it is not necessary for the user to individually adjust the threshold value for each of the plurality of photoelectric sensors, and the adjustment of the threshold values of the plurality of photoelectric sensors can be facilitated.

According to the present invention, it is possible to provide a photoelectric sensor and a photoelectric sensor system, with which received light quantities of a plurality of photoelectric sensors are displayed in an integrated manner, the display of the received light quantities is stabilized without any influence of variations in the light quantities that has nothing to do with a detected condition of a workpiece, and a photoelectric sensor with abnormity can be easily found out.

BRIEF DESCRIPTION OF THE DRAWINGS

FIG. 7 is a diagram illustrating the transition of screens of the display unit when a threshold value is altered when executing the preset function according to the present invention, and contrasting actual threshold values and actual received light quantities; and FIG. 8 is a diagram illustrating an operation of common keys in the case in which a plurality of photoelectric sensors according to the present invention that are coupled are used.

DESCRIPTION OF THE PREFERRED EMBODIMENTS

Figure 1A:
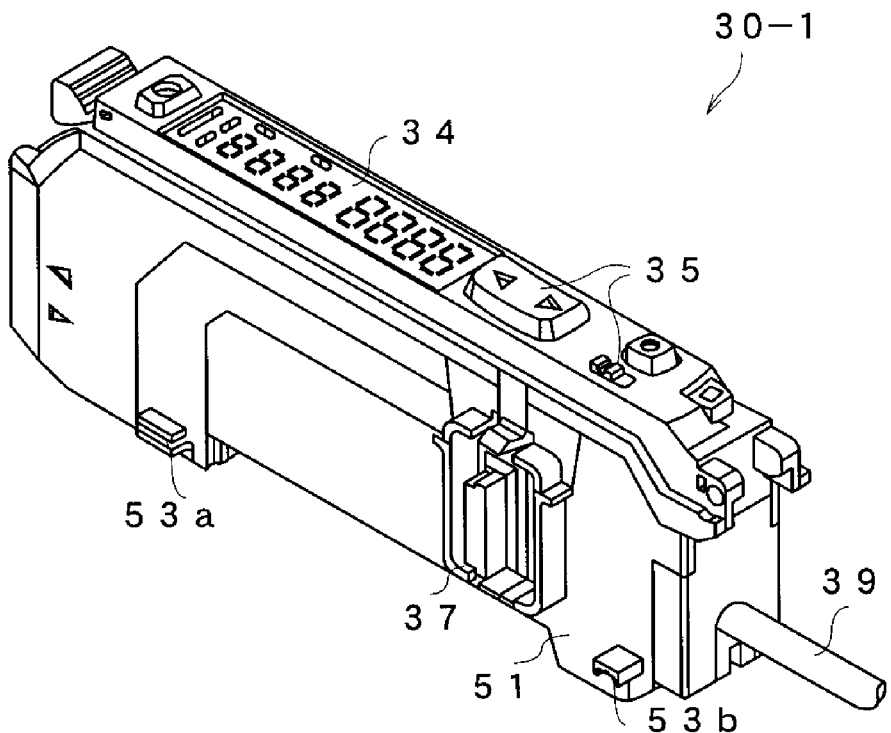
FIGS. 1A and 1B respectively are perspective views of a photoelectric sensor according to the present invention viewed from either side.
Figure 1B:
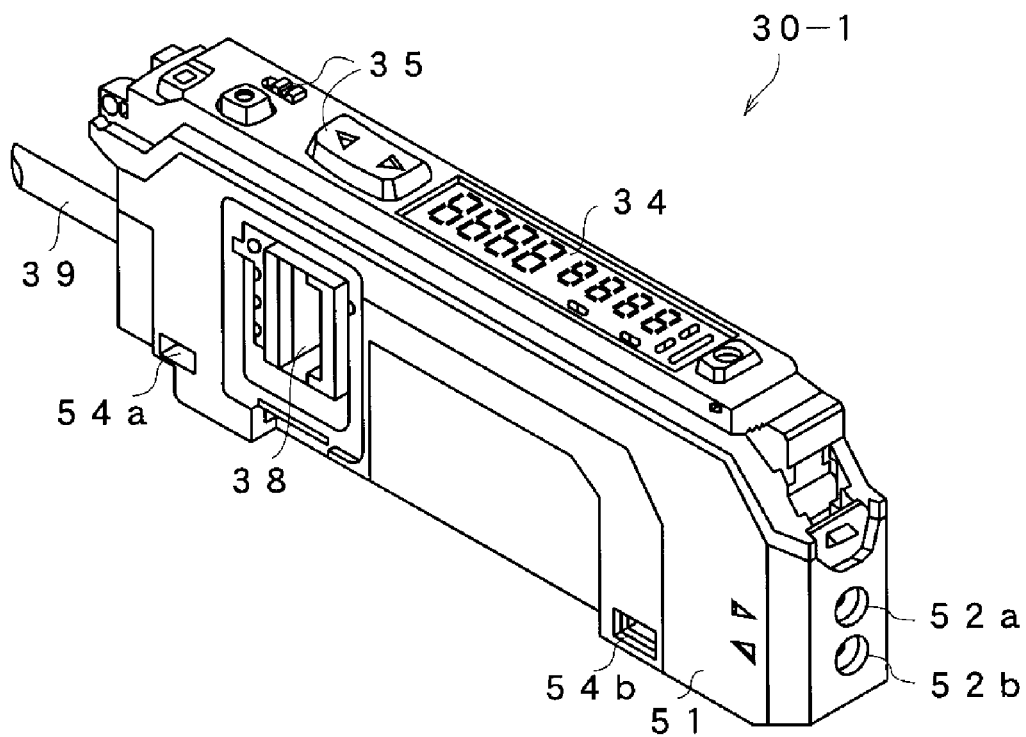
Figure 2:
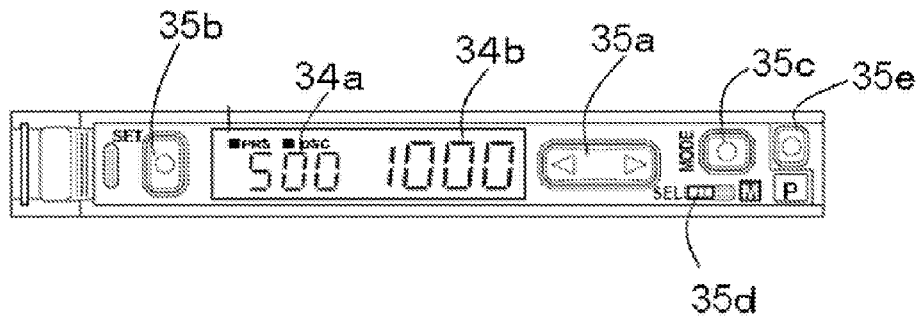
FIG. 2 is a top view illustrating the photoelectric sensor according to the present invention viewed from its top.

The following describes a photoelectric sensor of a preferred embodiment according to the present invention in detail with reference to the attached drawings. FIG. 1A is a perspective view of a photoelectric sensor 30 of this embodiment viewed from one side, and FIG. 1B is a perspective view of the photoelectric sensor 30 viewed from the other side. Further, FIG. 2 is a top view of the photoelectric sensor 30 viewed from its top. As shown in FIGS. 1A and 1B, the photoelectric sensor 30 is a unit configured by containing a component within a narrow case 51. Such as a display unit 34 constituted by 7-segment LEDs of 4 digits and an operation unit 35 constituted by various switches are provided on an upper surface of the case 51. The display unit 34 can display either a received light quantity and a set threshold value, or a received light quantity and a margin of the sensor digitally at the same time.

The operation unit 35 is provided with an up-down switch 35a, a set switch 35b, a mode switch 35c, a channel selector 35d, and a preset switch 35e. The display unit 34 is provided with a first display unit 34a and a second display unit 34b that are disposed laterally adjacent to each other along a longitudinal direction of the case 51. Each of the display units 34a and 34b is constituted by a 7-segment LED of 4 digits.

Although not shown in FIG. 1, a detachable cover that covers the upper surface of the case 51 is provided on its top. Further, for an end portion of the case 51 in the longitudinal direction, head attachment holes 52a and 52b for attaching optical fibers 32a and 33a and a fixing lever for fixing the optical fibers 32a and 33a are provided.

As shown in FIG. 1A, a connector 37 is provided for one side of the case 51. Further, engagement projections 53a and 53b are provided for the one side of the case 51 in the vicinity of its both ends in the longitudinal direction. The engagement projections 53a and 53b are for engagement with a network unit 10 that will be later described, and constitute a physical connection unit for realizing positioning and connection when coupling with the network unit 10. The connector 37 constitutes a connection unit for electrically connecting the network unit 10 or the photoelectric sensor 30 on the upstream side.

As shown in FIG. 1B, a connector 38 is provided for the other side of the case 51 at a position symmetrical to the connector 37. Further, engagement recesses 54a and 54b are provided for the other side of the case 51 in the vicinity of its both ends in the longitudinal direction. The engagement recesses 54a and 54b are for engagement with the engagement projections provided for the photoelectric sensor 30 on the downstream side by fitting into the recesses, and constitute a physical connection unit for realizing positioning and connection when coupling the photoelectric sensors 30 with each other. The connector 38 constitutes a connection unit for electrically connecting the photoelectric sensor 30 on the downstream side.

Figure 3:
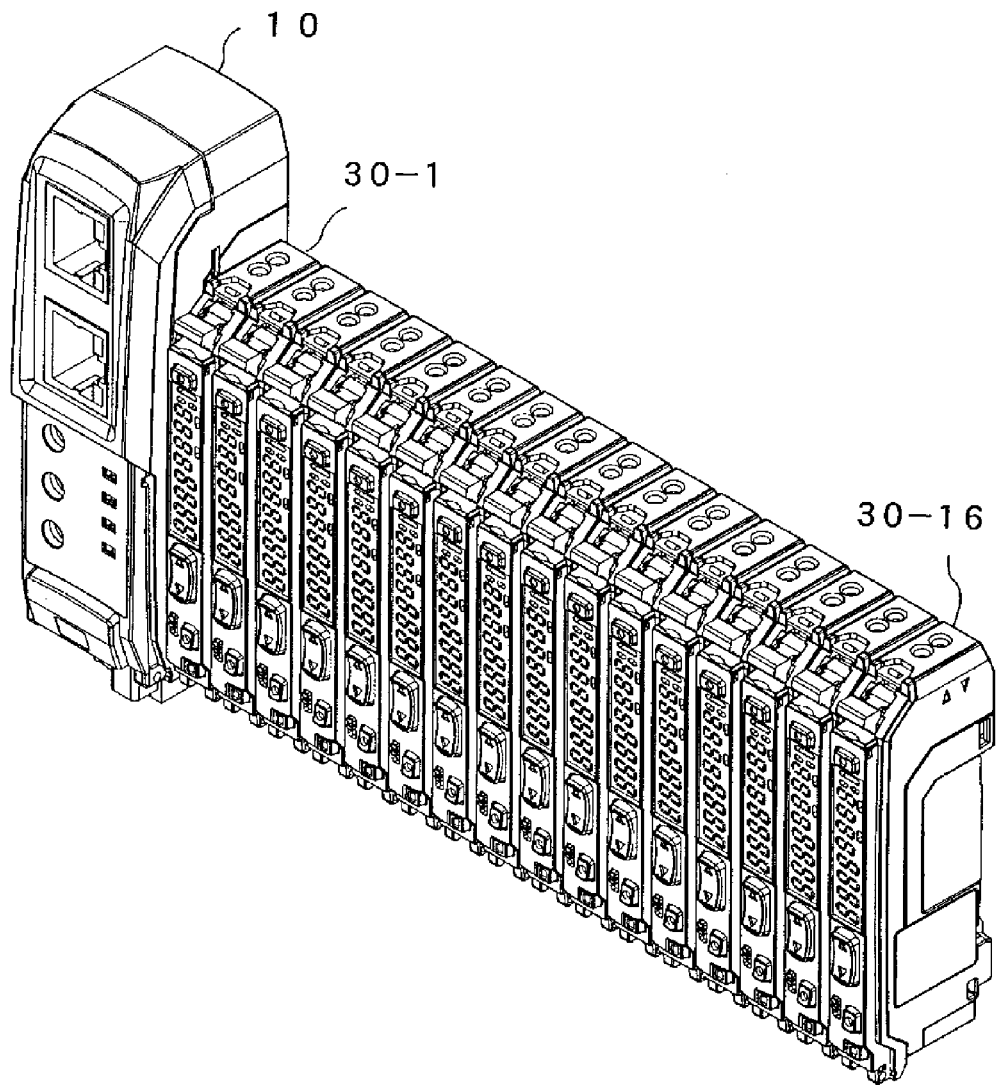
FIG. 3 is a perspective view illustrating a photoelectric sensor system according to the present invention viewed from its side.

The photoelectric sensor 30 according to this embodiment is able to transfer data to an upper level control device such as a PLC that is not shown in the drawing via the network unit 10, or accept a command from the upper level control device. FIG. 3 is a diagram showing a structure of a serially coupled sensor system in which the plurality of photoelectric sensors 30 are coupled and that is connected to an upper level control device via the network unit 10. The network unit 10 is provided with a network port 18 and is able to input an external input signal from the upper level control device to each photoelectric sensor either individually or at the same time via the network port 18.

Figure 4:
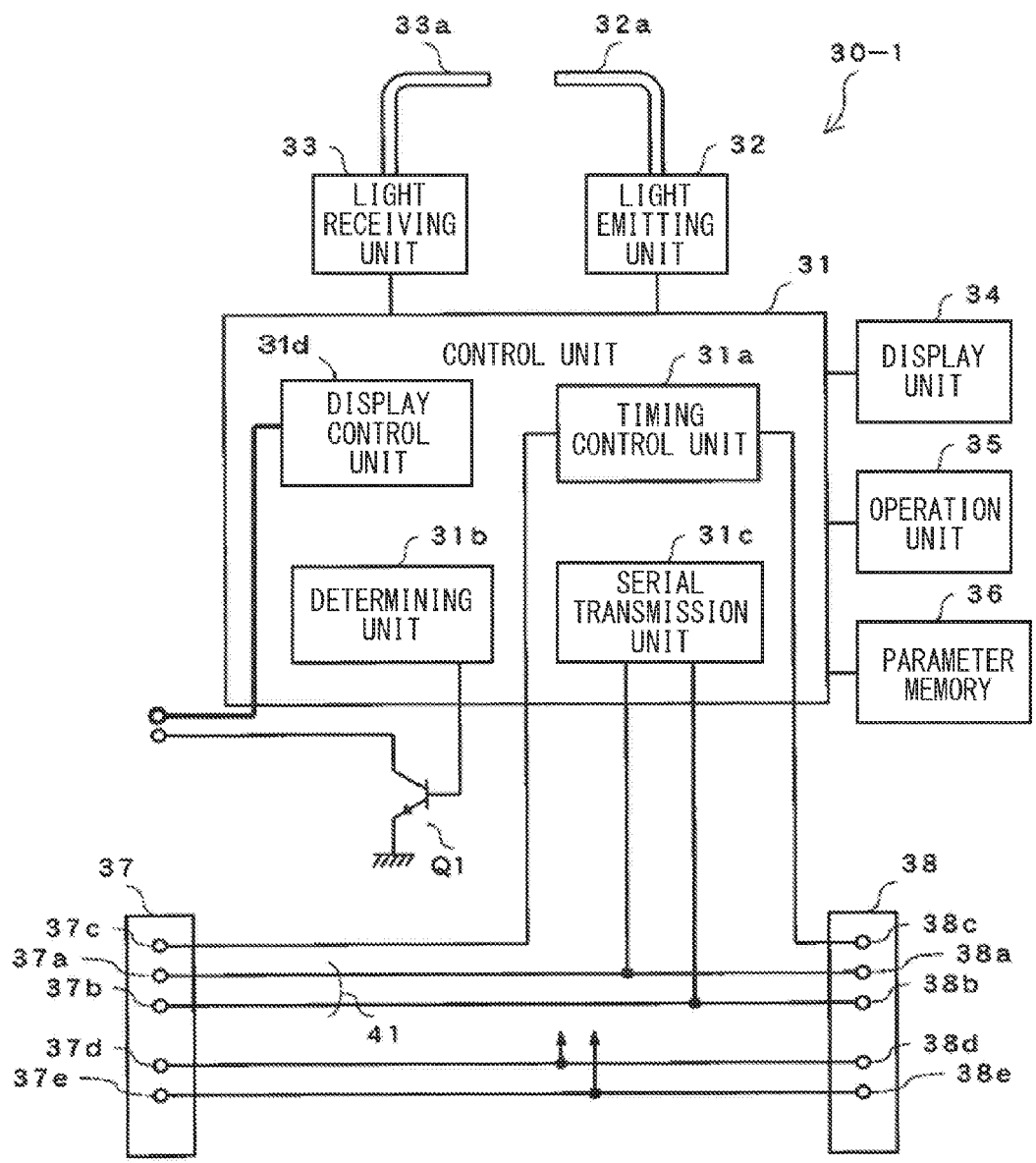
FIG. 4 is a block configuration diagram of the photoelectric sensor according to the present invention.

FIG. 4 is a functional block diagram of an internal structure of the photoelectric sensor 30. The photoelectric sensor 30 has a control unit 31 that is configured using a single-chip gate array or microprocessor. The control unit 31 is provided therein with a timing control unit 31a, a determining unit 31b, a serial transmission unit 31c, and a display control unit 31d. Further, the control unit 31 is connected with a light emitting unit 32, a light receiving unit 33, the display unit 34, the operation unit 35, a memory 36, an output transistor Q1, and the connectors 37 and 38.

The control unit 31 has a function for sending and receiving a serial signal to and from the network unit 10 via serial transmission lines 41. The control unit 31 also has a function for turning on an update flag held in the memory 36 when a parameter of the photoelectric sensor 30 is updated and resetting the flag upon completion of transmission of the parameter.

The determining unit 31b is a determination unit for discriminating and converting a received light quantity into a binarized determination signal that is either on or off based on a predetermined threshold value. The determination signal of the sensor is directly outputted outside via the output transistor Q1.

The serial transmission unit 31c is connected to the serial transmission lines 41 of the connectors 37 and 38, and carries out serial communication with the network unit 10 that is connected to a serially coupled sensor system 1, and constitute a serial transmission unit.

The display control unit 31d causes the display unit 34 to display a light quantity received by the light receiving unit 33 and a previously set threshold value. The display control unit 31d also accepts an operation of the operation unit 35 and causes the display unit 34 to display indication that corresponds to the operation.

The light emitting unit 32 drives a light-emitting device based on a timing signal from the timing control unit 31a. The light from the light-emitting device is transmitted via the optical fiber 32a and applied from a tip end. The light applied from the optical fiber 32a enters through an object sensing area into the optical fiber 33a and guided toward the light receiving unit 33. The light receiving unit 33 carries out amplification by converting the incident light into an electric signal.

The memory 36 is provided with a volatile memory that records the received light quantity and a determination signal that have been detected, and a nonvolatile memory that records such as a configuration parameter and initialization information that are individually set by each photoelectric sensor. The memory will be later described in detail.

The connector 37 is mutually connectable to the connector 38 of the photoelectric sensor 30 that is adjacent with the network unit 10. Further, two connection terminals 37a and 37b of the connector 37 connected to the upstream side of the serial transmission lines 41 and connection terminals 38a and 38b of the connector 38 are directly connected, respectively, thereby forming the serial transmission lines 41.

The connector 38 is provided with the two connection terminals 38a and 38b that are connected to the downstream side of the serial transmission lines 41. The connection terminals 37a and 37b of the connector 37 and the connection terminals 38a and 38b of the connector 38 are directly connected, respectively, thereby forming the serial transmission lines 41.

A connection terminal 37c of the connector 37 is connected to a connection terminal 38c of the connector 38 via the timing control unit 31a. Further, connection terminals 37d and 37e of the connector 37 and connection terminals 38d and 38e of the connector 38 are directly connected, respectively, thereby supplying the electronic power to the photoelectric sensor 30 as well as to the photoelectric sensor 30 on the downstream side.

Figure 5:
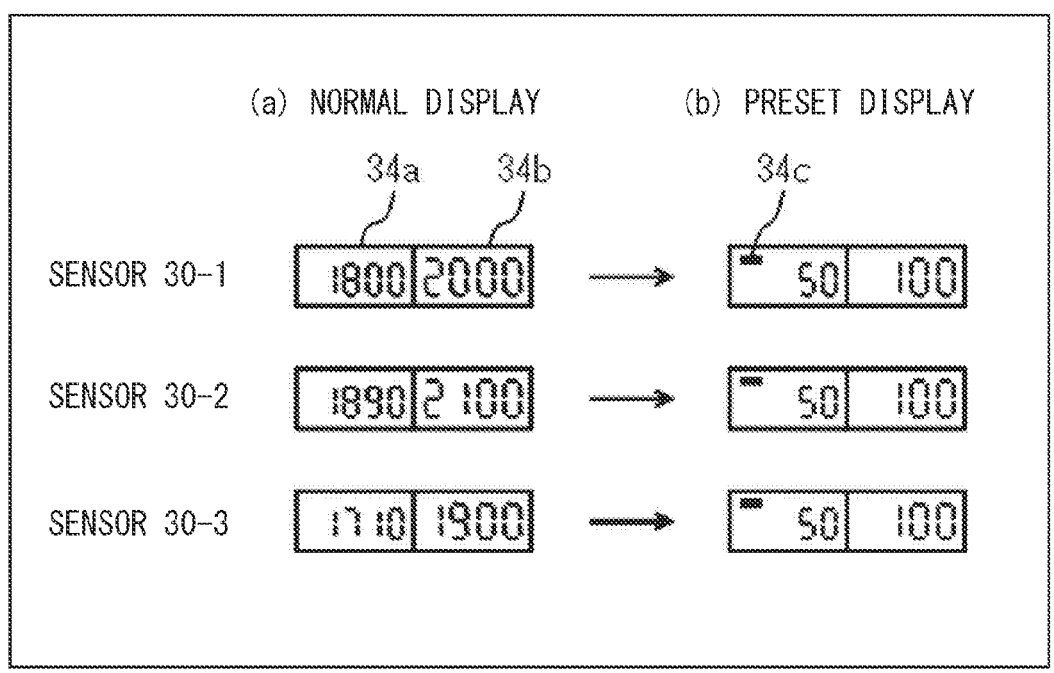
FIG. 5 is a diagram showing transition of screens of a display unit when executing a preset function according to the present invention.

The following describes a preset function of the photoelectric sensor 30 according to this embodiment thus structured. FIG. 5 is a diagram illustrating transition of screens of the display unit 34 when executing the preset function according to the present invention. In the example shown in FIG. 5, three photoelectric sensors 30-1, 30-2, and 30-3 are connected to an upper level control device 42 via the network unit 10. In a normal display state, each photoelectric sensor displays the threshold value in the display unit 34a and the received light quantity at the time in the display unit 34b. The example shown in FIG. 5 shows the received light quantity of a transmissive photoelectric sensor in a state in which the light is not blocked by a workpiece.

As shown in (a) of FIG. 5, each photoelectric sensor shows individual variability in the luminance of the built-in light-emitting device, the sensitivity and the offset of the light-receiving device, and/or the accuracy of a position for inserting the optical fiber, even when used under the same environment, and thus the received light quantities of the photoelectric sensors cannot become the same. Therefore, as shown in (a) of FIG. 5, if it is desired to set the threshold value of the received light quantity to be 90% of the received light quantity when the light is incident, it is required to set a threshold value individually different for each photoelectric sensor, which takes a lot of trouble for the user.

Therefore, when the user either presses the preset switch 35e of each photoelectric sensor or sets the preset function as an external input function for scaling the received light quantity and the external input signal is inputted into the photoelectric sensor, the current received light quantity is scaled to a predetermined target value as shown in (b) of FIG. 5, and the received light quantities of all of the photoelectric sensors are unified. According to this embodiment, a display upper limit when executing the preset function is fixed to 100, and an initial threshold value after executing the preset function is fixed to the half of this, i.e., 50. The display upper limit when executing the preset function is not a 4-digit maximum value to be displayed that can be shown in the display unit 34b (9999), but is fixed to a value smaller than the maximum value to be displayed. The display upper limit is fixed to 100 in this embodiment, but not particularly limited to this value, and such as 200 or 1000 can be set as the display upper limit when executing the preset function. Further, the initial threshold value when executing the preset function is fixed to 50 in this embodiment, but not particularly limited to this value as long as the initial threshold value is smaller than the display upper limit.

A preset display 34c shows an indication whether or not the preset display function is being executed, and is only lighted while executing the preset function. By seeing the preset display 34c, the user can easily determine whether the currently displayed threshold value and received light quantity are the values before scaled or after scaled.

Figure 6:
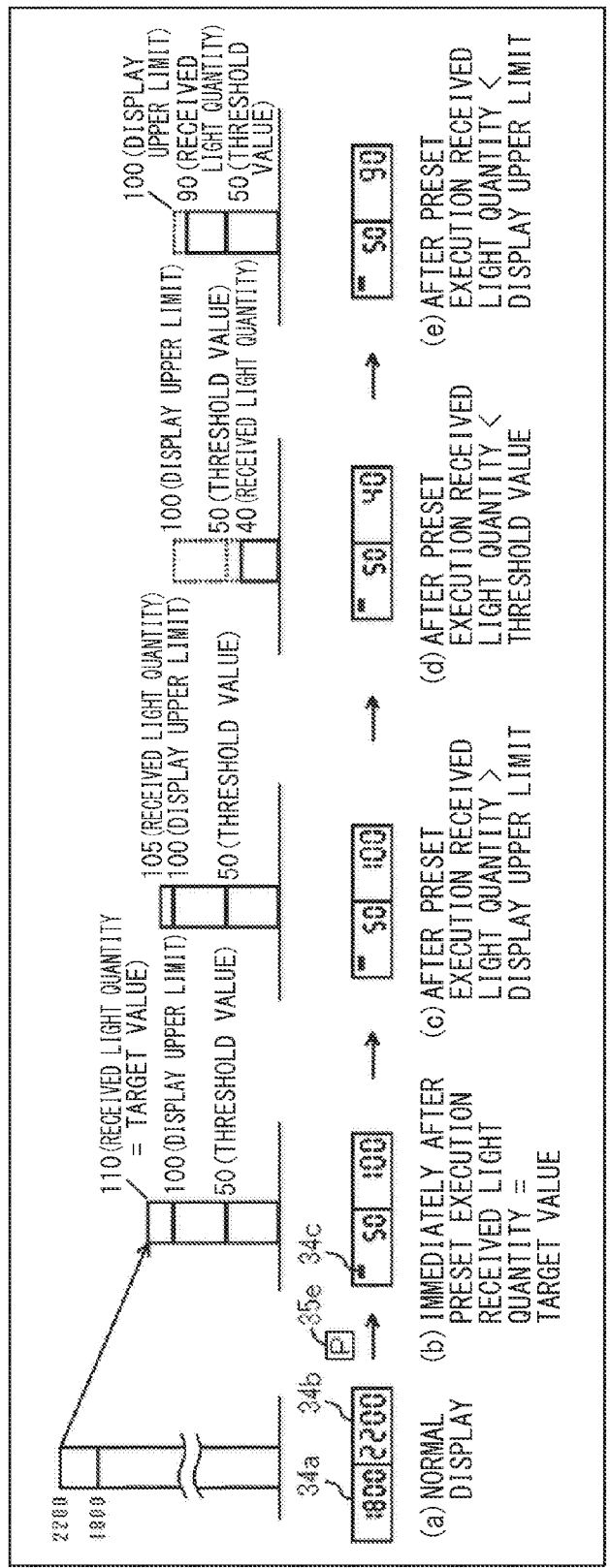
FIG. 6 is a diagram illustrating the preset function according to the present invention.

FIG. 6 is a diagram for explaining the preset function according to this embodiment. Upon acceptance of the external input signal or the pressing of the preset switch 35e in the normal display (a) in which the threshold value and the received light quantity are respectively displayed in the display unit 34a and the display unit 34b, the control unit 31 of the photoelectric sensor 30 scales the current received light quantity (2200, here) to the previously set target value (110, here). The target value can be altered by the user, and it is possible to set a value greater than the display upper limit when executing the preset function as shown in (b) of FIG. 6. The scaled received light quantity is displayed in the display unit 34b, and the threshold value is automatically set to the half of the display upper limit, i.e., 50, and displayed in the display unit 34a.

When the preset function is executed, the control unit 31 of the photoelectric sensor 30 calculates a scaling adjustment ratio when the current received light quantity is assigned to the target value, and records the calculated ratio in a configuration information memory 36c for the sensor. In the example shown in FIG. 6, a value 2200 as the received light quantity is assigned to a value 110 as the target value. Therefore, a value 0.05 obtained by dividing the target value by the received light quantity is recorded as the scaling adjustment ratio. The control unit 31 multiplies the received light quantity newly obtained after executing the preset function by the scaling adjustment ratio 0.05 and attempts to display the obtained value in the display unit 34b. However, as the display upper limit when executing the preset function is fixed to 100, if the received light quantity after the scaling obtained by multiplying the scaling adjustment ratio 0.05 is greater than 100, the value 100 as the display upper limit is displayed as the received light quantity after the scaling in the display unit 34b.

In the example shown in FIG. 6, the display upper limit 100 converted to the received light quantity before the scaling corresponds to a value 2000, the display unit 34b continues to display the display upper limit 100 unless the actual received light quantity becomes smaller than 2000. In (c) of FIG. 6, the situation in which the received light quantity is slightly decreased due to an influence of an environmental change or deterioration of the devices after executing the preset function. In the example shown in (c) of FIG. 6, the received light quantity after the scaling is decreased down to 105 from 110, but still greater than the display upper limit 100. Accordingly, the display unit 34*b* still displays the display upper limit 100 without altering the indicated value. In this manner, by setting the target value when executing the scaling greater than the display upper limit when executing the preset function, it is possible to ignore a slight decrease in the received light quantity after executing the preset function and to reflect only a large change in the received light quantity such as when detecting a workpiece that the user originally wishes to monitor as shown in (d) of FIG. 6 in the display unit 34*b*. Therefore, the display of the received light quantities may not be affected by variation in the light quantity due to the influence of the environmental change or the dirt immediately after executing the preset function.

Further, as shown in (e) of FIG. 6, if the received light quantity after the scaling is displayed to be smaller than the display upper limit 100 even though the workpiece is not detected, it is possible to determine that a measurable level of large environmental changes or deterioration of the devices have occurred. In such a case, the preset function can be again executed to set the threshold value again, or it is possible to carry out maintenance of a use environment or replacement of components. As described above, according to this embodiment, it is possible to easily find out a photoelectric sensor whose received light quantity is decreased at a level that requires maintenance by the user.

The setting of the target value as described above can be freely altered by the user in a predetermined range of values greater than the display upper limit 100 (100 to 200, for example). When a large target value is set, the display unit 34*b* continues to display the display upper limit unless the received light quantity decreases to a large extent. In contrast, if a value closer to the display upper limit is set as the target value, a slight decrease in the received light quantity is reflected to the display unit 34*b*. Therefore, it is possible for the user to set the target value according to the purpose, thereby setting a level of the decrease in the received light quantity at which the display of the display unit 34*b* is changed. Further, the target value can be set to be equal to the display upper limit if the user wishes to know the decrease in the received light quantity immediately after executing the preset function accurately.

The threshold value when executing the preset function is set at a predetermined ratio (50% in this embodiment) with respect to the display upper limit. The threshold value is set by the ratio with respect to the fixed display upper limit and not to the target value that can be altered by the user, it is possible to integrally manage the threshold values to be the same even when the target values of the plurality of photoelectric sensors are different. Further, even if the actually obtained received light quantity is internally assigned to a value greater than the display upper limit, the user recognizes the received light quantity displayed in the display unit 34*b* as the current received light quantity. Accordingly, by setting the threshold value at the ratio with respect to the display upper limit that is actually displayed, it is possible to prevent the user from being unnecessarily confused.

The threshold value while executing the preset function can be adjusted by the user operating the up-down switch 35*a*. FIG. 7 is a diagram illustrating the transition of the display screens when the threshold value is altered after executing the preset function and contrasting the received light quantity and the threshold value before the scaling while each display screen is displayed. As shown in FIG. 7, the display unit 34 displays the received light quantity and the threshold value (hereinafter referred to as the display threshold value) after the scaling when the preset function is executed. However, internally, the control unit 31 outputs a determination signal based on the comparison between the actual received light quantity and the threshold value (hereinafter referred to as the determination threshold value) before the scaling. When the preset switch 35*e* is pressed in the normal display state shown in (a) of FIG. 7, the preset function is executed, and as shown in (b) of FIG. 7, the received light quantity 2000 is scaled to the target value 100, and the received light quantity 100 after the scaling is displayed. Here, it is assumed that the target value is set equally to the display upper limit 100. When the preset function is executed, as the display threshold value, a value 50 which is 50% of the display upper limit 100 is initially displayed, but can be modified as shown in (c) of FIG. 7 by operating the up-down switch 35*a*. When the display threshold value is altered from 50 to 90, for example, the determination threshold value to the received light quantity before the scaling is altered from 1000 to 1800.

As shown in (d) of FIG. 7, when the received light quantity is decreased by the variation in the light quantity due to the influence of the environmental change or the dirt, the user can cause the preset function to be executed again by pressing the preset switch 35*e*. In the example shown in (d) of FIG. 7, the received light quantity 1900 is re-scaled to the target value 100 by pressing the preset switch 35*e* again and the received light quantity 100 after the scaling is displayed. Upon acceptance of the pressing of the preset switch 35*e*, the control unit 31 of the photoelectric sensor 30 assigns the received light quantity 1900 to the target value 100, and alters the determination threshold value to the received light quantity before the scaling to a value 1710 which is 90% of the received light quantity 1900 (see (e) of FIG. 7). The display threshold value is not altered and maintained to be the display threshold value 90. In this manner, the determination threshold value is altered so as to maintain the ratio with respect to the display upper limit of the displayed threshold value even if the preset function is executed again after altering the display threshold value once. Therefore, the threshold value of a desired ratio that corresponds to the received light quantity can be automatically set at that time every time when the preset function is executed, and thus it is possible to easily carry out the maintenance.

By long pressing the preset switch 35*e*, for example, as shown in (f) of FIG. 7, it is possible to shift from the preset display to the normal display. Upon shifting to the normal display, the actual received light quantity and the actual threshold value are displayed while maintaining correlation between the received light quantity and the display threshold value after the scaling shown in the preset display.

With the photoelectric sensor 30 according to this embodiment, it is possible to constitute a photoelectric sensor system by, as described with reference to FIG. 3, coupling the plurality of photoelectric sensors. As described above, each photoelectric sensor shows individual variability in the luminance of the light-emitting device, the sensitivity and the offset of the light-receiving device, and/or the accuracy of the position for inserting the optical fiber that are built-in even when used under the same environment, and thus the received light quantities of the photoelectric sensors cannot become the same. FIG. 8 is a diagram illustrating transition of the screens of the display unit in each photoelectric sensor when using four photoelectric sensors that are coupled. As shown in (a) of FIG. 8, the received light quantities of the photoelectric sensors are different even under the same environment. Accordingly, by using the preset function described above, as shown in (b) of FIG. 8, the received light quantities of the plurality of photoelectric sensors are scaled, and the received light quantities and the threshold values can be displayed in an integrated manner.

The preset function described above can be executed by setting the preset function as the external input function to each photoelectric sensor, and either by inputting the external input signal from the upper level control device 14 or by pressing down the preset switch 35e provided for each photoelectric sensor. When the preset function is executed by pressing the preset switch 35e, as shown in (b) of FIG. 8, it is possible to cause other photoelectric sensors coupled to the photoelectric sensor 30-1 to execute the preset function by pressing the preset switch 35e of the photoelectric sensor 30-1 as a base unit using a common key operation function, without pressing the preset switch 35e for all of the photoelectric sensors.

Upon acceptance of the operation of the preset switch 35e, the control unit 31 of the photoelectric sensor 30-1 as the base unit sends a preset execution signal for causing the photoelectric sensors 30-2 to 30-4 to execute the preset function via the serial transmission lines 41. A key lock is previously set for the photoelectric sensor 30-4, and the preset function is not executed even when the preset execution signal is accepted from the base unit and an symbol "Loc" indicating that the key lock is set is displayed in the display unit 34a. The key lock can be previously set by operating the operation unit 35 of the photoelectric sensor.

The photoelectric sensors 30-2 and 30-3 that have accepted the signals for executing the preset function execute the preset function, and scale the received light quantities at the time to the target value, and display the received light quantities after the scaling, as well as to set the threshold values to an initial value 50. If it is desired to alter the threshold value from the initial threshold value 50, it is possible to alter the threshold value by operating the up-down switch 35a of the photoelectric sensor as the base unit. The control unit 31 of the photoelectric sensor 30 accepts the operation for altering the threshold value and executes a process of altering the threshold value, and sends threshold value adjustment signals to other photoelectric sensors 30-2 and 30-3 via the serial transmission lines 41, thereby altering the threshold values of other photoelectric sensors at the same time as shown in (c) of FIG. 8. For example, when operating to increment the threshold value of the photoelectric sensor 30-1 by one using the up-down switch 35a, the threshold values of the photoelectric sensor 30-2 and 30-3 can also be incremented by one.

As described above, the common key operation according to this embodiment enables the operation of the photoelectric sensor as the base unit and the operation of the photoelectric sensors as sub units to be completely common. Specifically, in addition to accepting the operation to the base unit for executing the preset function and causing the sub units to execute the preset function, the threshold value adjustment signals are sent to the sub units every single operation of the up-down switch 35a for altering the threshold value, and the results of the alteration of the threshold values are updated in real time in the display units 34a of the photoelectric sensors. Therefore, only by carrying out the execution instruction for the preset function to the photoelectric sensor 30-1 as the base unit and altering the threshold value, it is possible for the user to complete the setting for the photoelectric sensors 30-2 and 30-3 as the sub units at the same time.

In the case in which a photoelectric sensor for which it is not desired to accept the common key operation from the base unit is coupled, it is possible to either set the key lock as described above or disable the acceptance of the common key operation for the photoelectric sensor. These can be set by operating the operation unit 35 to call a setting menu in the display unit 34, and the configuration information is recorded in the configuration information memory 36c of each photoelectric sensor.

If the scaling target value is set to be greater than the display upper limit when executing the preset function, the slight decrease in the received light quantity is not reflected to the display unit 34, and the display upper limit continues to be displayed as the received light quantity after the scaling. However, as the case of the display of the received light quantity of the sensor 30-2 shown in (d) of FIG. 8, if the received light quantity is decreased to a large extent due to the influence of the environmental change or the deterioration of the devices, the displayed received light quantity becomes smaller than the display upper limit 100 and the received light quantity after the scaling is displayed. In such a case, by pressing the preset switch 35e of the photoelectric sensor 30-2 and then executing the preset function again, the display of the received light quantity can be displayed again in an integrated manner with the display of the received light quantities of other photoelectric sensors.

As described above, according to the present invention, when the execution instruction of the scaled display is accepted by the control unit, the target value that is set to be greater than the display upper limit while executing the scaled display is assigned to the received light quantity, and accordingly, the display upper limit is displayed as the received light quantity after the scaling even when there is a slight decrease in the received light quantity. Therefore, it is possible to provided a highly stable display without being affected by the variation in the light quantity due to the environmental change that has nothing to do with the condition of the workpiece.

In particular, when using the plurality of photoelectric sensors that are coupled, the received light quantities of the plurality of photoelectric sensors are displayed in a unified manner and the threshold values can be integrally managed. In addition, as the subsequent slight variation of the received light quantity is ignored, it is possible to maintain the display of the received light quantity in a unified manner for an extended period of time. Further, these can be set at the same time based on the external input or by the common key operation. Therefore, it is possible to eliminate the necessity of the cumbersome setting to the plurality of photoelectric sensors by the user, and the necessity of individual management of the received light quantity and the threshold value due to individual variability in the received light quantity of the photoelectric sensor.

What is claimed is:

1. A photoelectric sensor that is provided with a light projecting unit projecting light toward a detection area and a light receiving unit receiving light from the detection area and generating a received light signal, the sensor being capable of obtaining a received light quantity based on the received light signal generated by the light receiving unit and comparing the received light quantity with a previously set threshold value, thereby detecting the presence of a workpiece in the detection area, the sensor comprising:

a display unit that displays the received light quantity;

an operation unit for instructing to execute a scaling function of assigning the received light quantity displayed in the display unit to a previously set target value; and a control unit that assigns a received light quantity when the instruction to execute the scaling function is accepted to the previously set target value, calculates a scaling adjustment ratio that is either a scale-up ratio or a scale-down ratio for assigning the received light quantity to the target value, and causes the display unit to display a received light quantity after the scaling obtained by scaling a subsequently obtained received light quantity up or down based on the scaling adjustment ratio, wherein the control unit assigns the received light quantity to a target value that is set to be greater than a display upper limit while executing the scaling function, and causes the display unit to display the display upper limit as the received light quantity after the scaling if the received light quantity after the scaling becomes greater than the display upper limit.

2. The photoelectric sensor according to claim 1, wherein upon acceptance of the instruction to execute the scaling function, the control unit sets a threshold value of a previously set ratio with respect to the display upper limit.

3. The photoelectric sensor according to claim 2, wherein the display unit includes a first display unit that displays the threshold value and a second display unit that displays the received light quantity, the operation unit includes a threshold value adjusting button for altering the threshold value, and the control unit is capable of executing an adjustment process of the threshold value by accepting an operation of the threshold value adjusting button while the received light quantity after the scaling is displayed in the second display unit and altering the ratio of the threshold value with respect to the display upper limit, and, upon acceptance of an instruction to execute the scaling function again after adjusting the threshold value, the control unit causes the display unit to display new received light quantity after the scaling by assigning a received light quantity at the acceptance to the target value, and maintains the ratio of the threshold value after the alteration.

4. The photoelectric sensor according to claim 2, wherein upon cancellation of the scaling function, the control unit sets the threshold value with respect to the received light quantity after canceling the scaling function again so as to maintain the ratio between the received light quantity and the threshold value after the scaling.

5. The photoelectric sensor according to claim 1, wherein the control unit is capable of selecting between making the target value to be equal to the display upper limit and increasing the target value to be greater than the display upper limit by accepting an operation from the operation unit, and the target value is alterable within a predetermined range if the target value is increased to be greater than the display upper limit.

6. The photoelectric sensor according to claim 1, wherein the display unit displays an indication that the received light quantity after the scaled display is being displayed in the display unit.

7. A photoelectric sensor system using the photoelectric sensor according to claim 1, wherein the photoelectric sensor is provided with a connection unit for communicating with a different photoelectric sensor, and the plurality of photoelectric sensors are coupled via the connection unit, and the control unit accepts an instruction to execute a scaling function from the operation unit, and sends the instruction to execute the scaling function to the different photoelectric sensor connected to the connection unit, a control unit of the different photoelectric sensor accepts the instruction to execute the scaling function and executes the scaling function.

8. The photoelectric sensor system according to claim 7, wherein upon acceptance of an adjustment process of the threshold value from the operation unit while executing the scaling function, the control unit executes the adjustment process of the threshold value, and sends a signal indicating the adjustment process of the threshold value to the different photoelectric sensor that is connected via the connection unit, and the control unit of the different photoelectric sensor accepts the signal indicating the adjustment process of the threshold value and executes the adjustment process of the threshold value.

* * * * *